US005674348A

United States Patent [19]

DeFiguerido

[11] Patent Number: 5,674,348

[45] Date of Patent: Oct. 7, 1997

[54] ENVELOPE FLAP MOISTENER AND SEALER

[75] Inventor: Carlos L. DeFiguerido, Danbury, Conn.

[73] Assignee: Pitney Bowes Inc., Stamford, Conn.

[21] Appl. No.: 932,901

[22] Filed: Aug. 20, 1992

Related U.S. Application Data

[63] Continuation of Ser. No. 636,533, Dec. 31, 1990, abandoned.

[51] Int. Cl.$^6$ .......... B32B 31/00

[52] U.S. Cl. .......... 156/441.5; 156/442.1; 156/442.2; 271/2

[58] Field of Search .......... 271/2, 274, 262, 271/263; 156/441.5, 442.1, 442.2

[56] References Cited

U.S. PATENT DOCUMENTS

| | | | |
|---|---|---|---|
| 1,194,568 | 8/1916 | Storck . | |
| 1,527,446 | 2/1925 | Schiesari | 118/429 X |
| 2,609,790 | 9/1952 | Uhl | 156/442.1 X |
| 2,749,689 | 6/1956 | Colley | 53/124 |
| 3,271,926 | 9/1966 | England | 271/2 |
| 3,981,270 | 9/1976 | Bogdanski | 156/442.2 |
| 4,170,350 | 10/1979 | Conti | 271/274 |
| 4,233,931 | 11/1980 | Gingerich et al. | 118/239 |
| 4,371,416 | 2/1983 | Denzin | 156/441.5 |
| 4,428,794 | 1/1984 | Hayskar et al. | 156/442.1 |
| 4,450,037 | 5/1984 | Gavronsky | 156/441.5 |
| 4,570,923 | 2/1986 | Hooper et al. | 271/275 |
| 4,607,835 | 8/1986 | Wilson et al. | 271/274 |
| 4,619,101 | 10/1986 | Havey, Jr. et al. | 53/117 |
| 4,619,451 | 10/1986 | Dodge | 271/274 |
| 4,775,140 | 10/1988 | Foster | 271/121 |
| 4,821,049 | 4/1989 | Eckl | 271/274 |
| 4,861,018 | 8/1989 | Kerstein | 271/274 |
| 4,948,453 | 8/1990 | Nobile et al. | 156/442.1 |
| 5,011,129 | 4/1991 | Holbrook | 271/274 |
| 5,091,738 | 2/1992 | Fulton et al. | 346/154 |

*Primary Examiner*—James Engel
*Attorney, Agent, or Firm*—Charles R. Malandra, Jr.; David E. Pitchenik; Melvin J. Scolnick

[57] ABSTRACT

Modular apparatus is disclosed for moistening and sealing an envelope flap. The apparatus comprises a base, in which a moistener is disposed and in which part of a transporter for moving an envelope to and past the moistener is also disposed. A cover in which the remaining portion of the transporter is disposed is pivoted to the base so that the cover may be pivoted open to expose the envelope path and the parts of the transporter in the base and in the cover. A pair of sealing rollers, one mounted to the base and the other to the cover, are disposed in the same module as the moistener downstream from the moistener. Providing part of the transporter in the base and part in the cover, and pivotally mounting the cover to base enables one to quickly gain access to the envelope path simply by unlatching the cover and pivoting it away from the base. This enables an operator to quickly gain access to the envelope path to remove a jammed envelope.

2 Claims, 7 Drawing Sheets

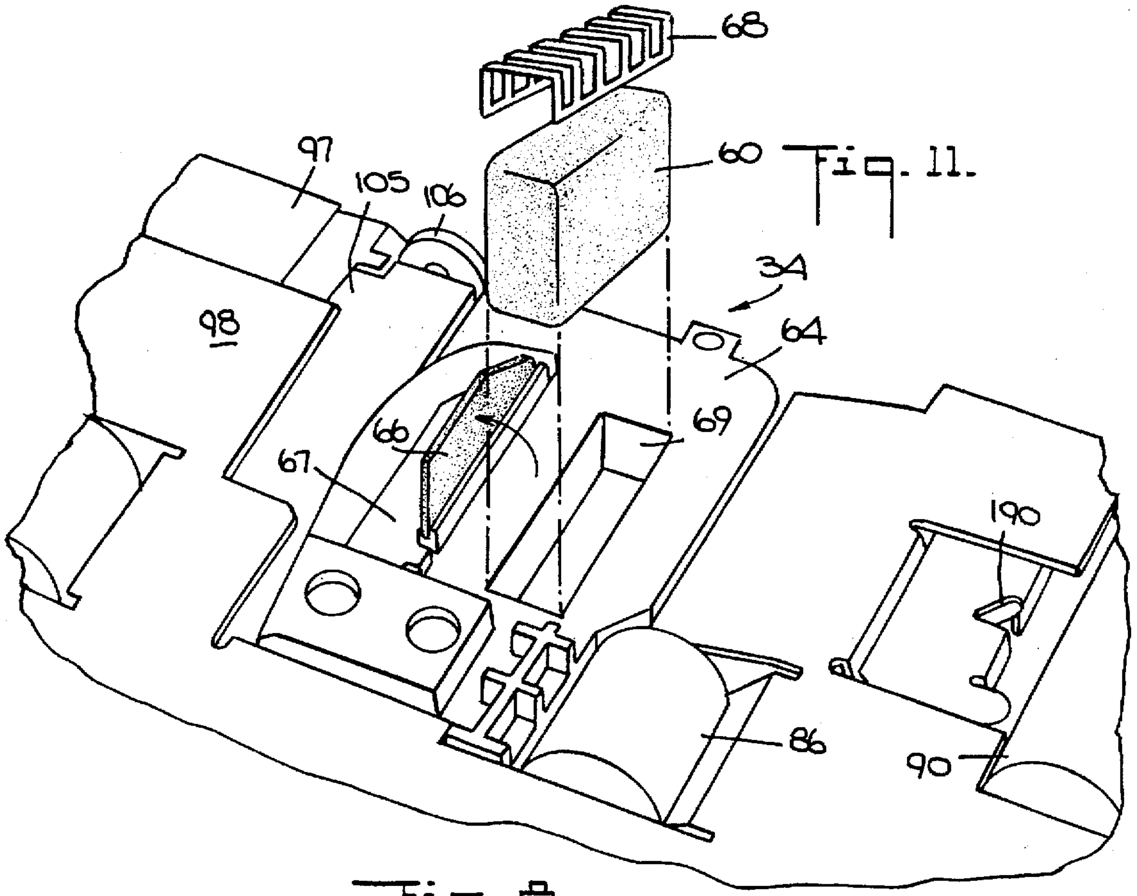
Fig. 11.
Fig. 8.
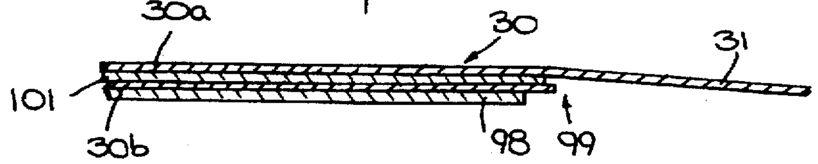
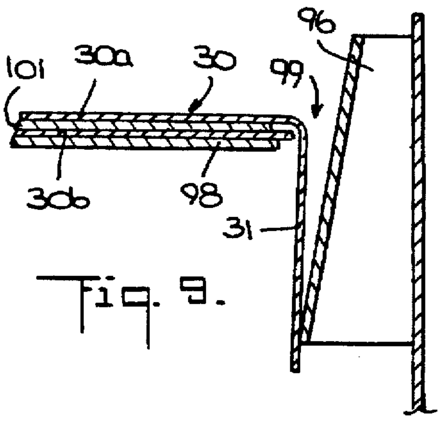
Fig. 9.
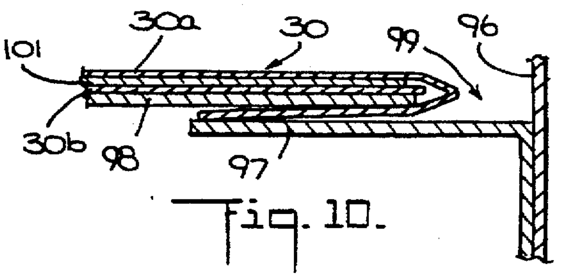
Fig. 10.

ENVELOPE FLAP MOISTENER AND SEALER

This application is a continuation of application Ser. No. 07/636,533, filed Dec. 31, 1990, now abandoned.

BACKGROUND OF THE INVENTION

The invention disclosed herein relates to apparatus for automatically moistening envelope flaps and sealing the envelopes, particularly to a modular envelope moistener and sealer apparatus which may be used alone and with mailing apparatus which automatically carries out one or more mailing functions.

The mailing process involves a number of operations including assembly and insertion of mail items into an envelope, moistening the envelope flap, sealing the envelope, weighing the envelope, applying postage, etc. Automation of such operations typically entails moving an envelope into and through a station which carries out the particular function. With respect to the envelope flap moistening and sealing operations, see, for example, U.S. Pat. No. 1,194,568 (Storck), U.S. Pat. No. 2,749,689 (Colley), U.S. Pat. No. 4,233,931 (Gingerich et al.), U.S. Pat. No. 4,371,416 (Denzin), U.S. Pat. No. 4,428,794 (Hayskar et al.) and U.S. Pat. No. 4,450,037 (Gavronsky). The disclosure of U.S. Pat. No. 4,450,037 (Gavronsky), which is assigned to the assignee of this application, is hereby incorporated by reference. Frequently, rollers and belt conveyers are used to move the envelope within a station while the particular mailing function is carried out. As the throughput of modern mailing apparatus increases, envelope jamming has occurred more frequently requiring more frequent operator intervention and longer overall machine down time. Where the envelope path is not easily accessible, machine down time has become even longer because of the difficulty of reaching and removing jammed envelopes.

U.S. Pat. No. 4,570,923 (Hooper et al.), U.S. Pat. No. 4,619,101 (Havey, Jr. et al.) and U.S. Pat. No. 4,775,140 (Foster) disclose apparatus carrying out various mailing functions in which jam-clearing acccess is provided. The Hooper et al. '923 patent relates to conveying apparatus; the Havey, Jr. et al. '101 patent relates to sheet folding and inserting apparatus; and the Foster '140 patent relates to a document inserter and envelope flapper.

OBJECTS AND SUMMARY OF THE INVENTION

It is an object of the invention disclosed herein to improve the throughput of automatic mailing apparatus, particularly automatic envelope moistening and/or sealing apparatus.

It is another object of the invention to improve access to the envelope travel path in automatic mailing apparatus, particularly automatic envelope moistening and/or sealing apparatus.

It is another object of the invention to reduce the time necessary to remove a jammed envelope from automatic mailing apparatus, particularly automatic envelope moistening and/or sealing apparatus.

It is another object of the invention to improve automatic envelope moistening and sealing apparatus.

The above and other objects are achieved in accordance with the invention by providing apparatus for moistening an envelope flap which comprise a first structure, e.g., a base, in which means for moistening an envelope is disposed and in which part of means for moving an envelope (e.g. a transporter) in a path to and past the means for moistening is also disposed, and another structure, e.g., a cover, in which the remaining portion of the means for moving the envelope is mounted. One of the structures may be moved from a first position adjacent the other structure in which the moving means functions to move an envelope in the path, to another position away from the other structure in which the envelope path is exposed. Means for sealing the moistened envelope flap may be disposed downstream of the envelope flap moistening means with parts mounted to the two structures so that the envelope path past the sealing means is also exposed when the one structure is moved away from the other structure.

The moistening means and the sealing means in the preferred embodiment form a composite modular envelope flap moistener and sealer, although they need not, and the moistening means and the sealing means may be provided with independent structures which may be moved to expose respective envelope paths past the moistening means and the sealing means.

For ease of description, one of the two structures described above will be referred to as a base and the other structure will be referred to as a cover. The means for moving in the preferred embodiment is a transporter which includes drive components mounted to the base.

The moving means comprises first means and second means which together cooperate to move the envelope along the path. The first means is mounted to the base and the second means is mounted to the cover. Means are provided for coupling the cover to the base such that the cover may be moved relative to the base between the first position adjacent the base in which the first and second means cooperate to move the envelope along the path, and the other position away from the base to expose the envelope path and permit easy access thereto.

In the preferred embodiment, the first and second means comprise opposed rollers mounted to the base and the cover which engage each other or an envelope fed to the nip of the opposed rollers. The drive components mounted to the base drive the roller(s) in the base. In a specific embodiment, the first means comprises a first roller rotatably mounted to the base in the envelope path upstream of the moistening means, and the second means comprises a second roller rotatably mounted to the cover opposite the first roller in the first position of the cover to cooperate with the first roller to receive and move an envelope therebetween. The first and second rollers move an envelope into the moistening means.

Preferably, additional rollers downstream of the moistening means assist in moving the envelope past and away from the moistening means. In a specific embodiment, the first means comprises a third roller rotatably mounted to the base in the envelope path downstream of the moistening means, and the second means comprises a fourth roller rotatably mounted to the cover opposite the third roller in the first position of the cover to cooperate with the third roller to receive and move an envelope received therebetween. The third and fourth rollers are spaced from the first and second rollers by a distance less than the length of an envelope to be moistened.

Preferably, each of the second and fourth rollers may be a pair of narrower, spaced-apart rollers which together and with the space therebetween extend for the full width of the first and third rollers.

In the preferred embodiment, the second means further comprises a rolling element, e.g., a grooved roller and an O-ring passing therearound, mounted to the cover laterally spaced from the first and second rollers, which is coupled to the second roller to rotate in synchronism with the second roller. Means in the base, e.g., a smooth, flat surface, cooperates with the rolling element in the first position to receive a portion of an envelope being advanced to the moistening means to engage the envelope portion therebetween and assist in moving the envelope in and through the moistening means.

In a specific embodiment, the rolling element comprises the grooved roller and the O-ring passing therearound referred to above, with the O-ring in the first cover position being closely adjacent the flat surface in the base to engage the envelope portion therebetween. The second means comprises a shaft to which the second roller and the rolling element roller are mounted, the rolling element roller being driven by virtue of rotation of the second roller as described above.

The second means comprises another rolling element mounted to the cover laterally spaced from the third and fourth rollers, which is coupled to the third roller to rotate in synchronism therewith. Means in the base, e.g., the smooth, flat surface, cooperates with this rolling element in the first position to receive a portion of an envelope being advanced through the moistening means and engage the envelope portion therebetween and assist in moving the envelope through and away from the moistening means. In a specific embodiment, this rolling element also comprises a grooved roller and the O-ring referred to above which passes around both rolling element rollers extending in engagement with the smooth, flat base surface from the first and second rollers, past the moistening means to the third and fourth rollers. The fourth roller is mounted to a shaft to which this other rolling element roller is also mounted, so that this other rolling element roller is rotated in synchronism with the fourth roller. Since the two rolling element rollers are coupled by the O-ring, the O-ring is rotated as long as either the second or the fourth roller is rotated. In the preferred embodiment, the flap portion of the envelope is engaged by the O-ring which holds the flap down as well as assists in moving the envelope.

In the preferred embodiment of the invention, means for sealing the envelope are disposed downstream of the moistening means mounted to the base and to the cover. In a specific embodiment, the sealing means comprises a first sealing roller mounted to the base downstream of the moistening means and a second sealing roller mounted to the cover downstream of the moistening means opposed to the first sealing roller in the closed position of the cover to compress an envelope passed therebetween and seal a flap moistened by the moistening means. In the preferred embodiment, the first sealing roller is mounted to the base downstream of the third roller and the second sealing roller is mounted to the cover downstream of the fourth roller.

Preferably, means are provided for resiliently mounting one or more of the rollers for movement towards and away from an opposed roller in the closed position of the cover to accommodate envelopes of varying thickness between opposed rollers. Advantageously, the roller or rollers mounted to the cover are resiliently mounted.

In the preferred embodiment, only the rollers in the base are driven, so that all drive elements may advantageously be mounted to the base.

In the preferred embodiment means are provided for coupling the cover to the base such that the cover in a closed position thereof is adjacent the base and in an open position thereof is pivoted away from the base. In a specific embodiment, such means pivotally couple the cover to the base.

It is another object of the invention to facilitate introduction of water into automatic envelope moistening apparatus.

This object is achieved in accordance with the invention, by providing a moistening means which comprises a reservoir in the base, means in communication with the reservoir for applying moisture to the flap and means in communication with the reservoir accessible from the exterior of the base for introducing water into the reservoir. In the preferred embodiment, the means for introducing water into the reservoir comprises an opening in the base communicating with the reservoir, a drawer slidably mounted in the opening above the reservoir movable between an open position in which water introduced into the drawer flows into the reservoir, and a closed position in which the drawer is closed substantially flush with the base.

The means for applying moisture comprises a wick disposed in a hole in the base with a first end of the wick in the reservoir and a second end of the wick exposed through the hole, and a grate covering the second end while permitting moisture to be transferred from the wick therethrough, the grate and the opening being structured to form a snap mount of the grate to the hole, whereby the grate may be removed from the hole and the wick removed from the reservoir through the hole.

BRIEF DESCRIPTION OF THE DRAWINGS

The invention is illustrated by way of example and not limitation in the figures of the accompanying drawings in which like references denote the same or corresponding parts, and in which:

FIG. 8 is a section view of an envelope in the apparatus of FIG. 1 taken through line 8—8 of FIG. 7;

FIG. 9 is a section view of an envelope in the apparatus of FIG. 1 taken through line 9—9 of FIG. 7;

FIG. 10 is a section view of an envelope in the apparatus of FIG. 1 taken through line 10—10 of FIG. 7; and FIG. 11 is an exploded perspective view of the flap moistening portion of the apparatus of FIG. 1.

DESCRIPTION OF THE PREFERRED EMBODIMENTS

Figure 1:
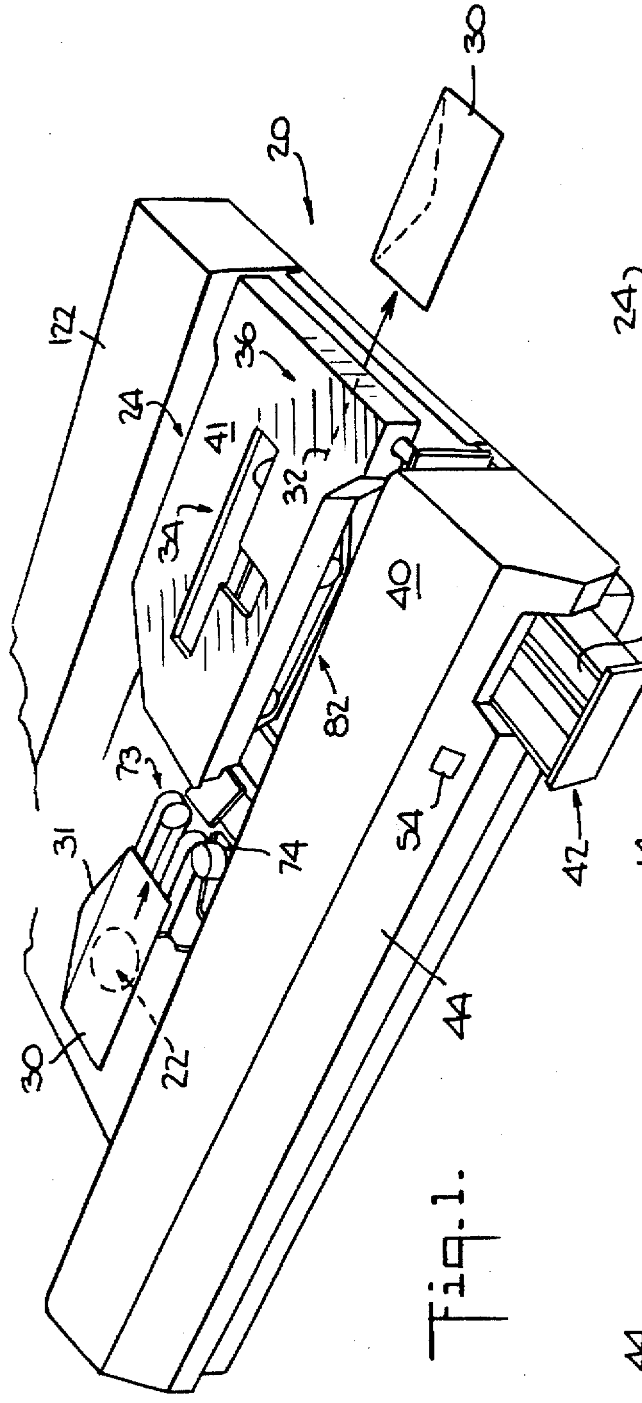
FIG. 1 is a perspective view of the top and side of envelope moistening and sealing apparatus in accordance with the invention and envelope turning apparatus upstream thereof, the envelope moistening and sealing apparatus being shown with its cover closed.

The mailing machine module 20 shown in FIG. 1 includes an envelope turner 22 and an envelope flap moistener and sealer 24. Envelope turner 22 does not form part of the invention disclosed herein, is represented schematically by a circle, and may be constructed as disclosed in U.S. Pat. No.

Figure 4:
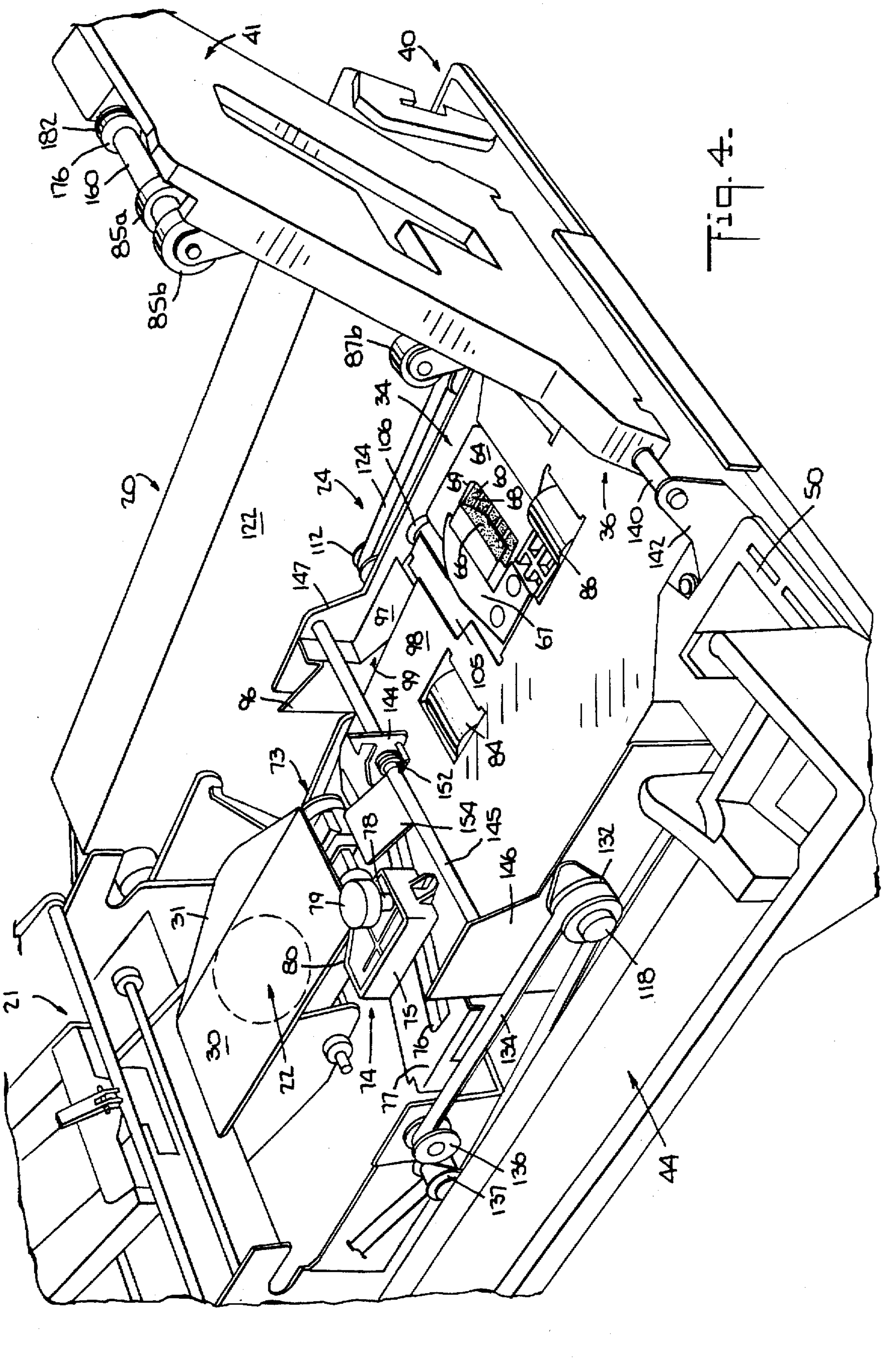
FIG. 4 is a perspective view of the top and side of the apparatus of FIG. 1 with the cover pivoted open.

4,928,807 titled "METHOD AND APPARATUS FOR TURNING FLAT ARTICLES", issued May 29, 1990 to the assignee of this application. The disclosure of U.S. Pat. No. 4,929,807 is hereby incorporated by reference. Referring to FIGS. 1 and 4, an envelope 30 feed by upstream processing apparatus 21 (FIG. 4) is turned 90° by envelope turner 22 from a lateral position (not shown) to a longitudinal position relative to the path of travel 32. Envelop turner 22 feeds envelope 30 in that longitudinal position to envelope flap moistener and sealer 24. Flap moistener and sealer 24 comprises an envelope flap moistener 34 which applies moisture to the flap 31 of an envelope 30, and an envelope flap sealer 36 which seals flap 31 closed. Although description of the presently preferred embodiment is made in connection with envelope flap moistener and sealer 24 in a common module with envelope turner 22, the invention is not limited to such a module, as envelope flap moistener and sealer 24 may be provided as part of a non-modular system, or as a module containing only envelope flap moistener and sealer 24, only envelope moistener 34 or only envelope sealer 36, or as a part of a module containing envelope flap moistener and sealer 24, envelope moistener 34 or envelope sealer 36 and other apparatus.

Figure 2:
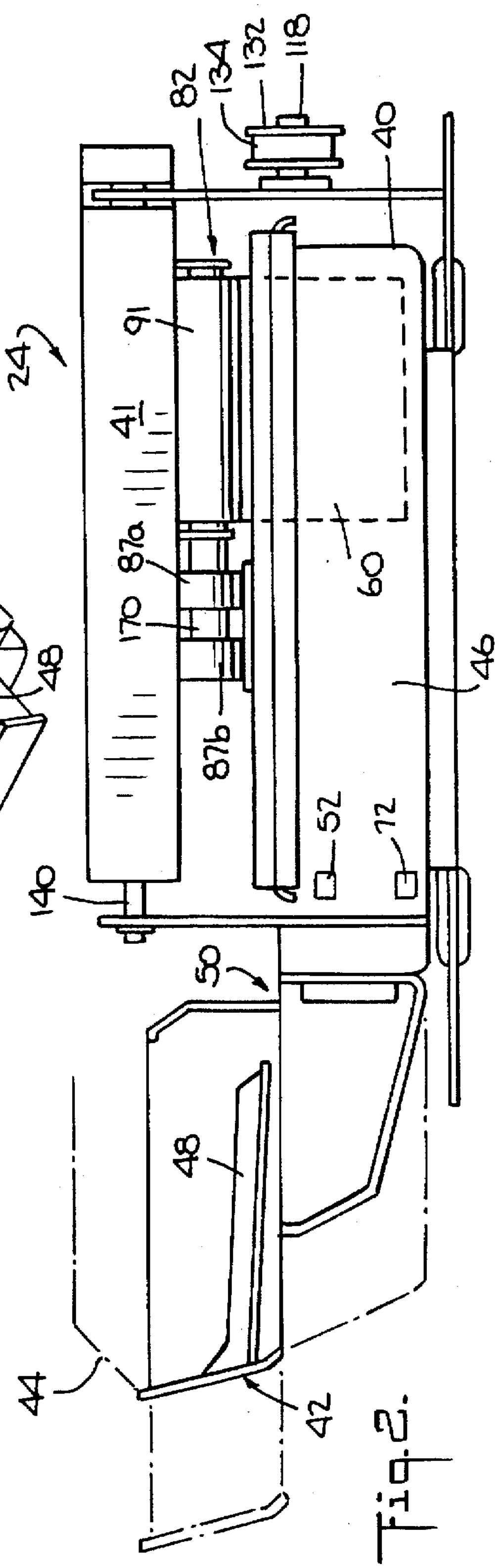
FIG. 2 is an end elevation view of the apparatus of claim 1.

Referring to FIGS. 1 and 2, envelope flap moistener and sealer 24 comprises a base 40 and a cover 41 pivotally mounted to base 40. Referring to FIGS. 1 and 4, one side 44 of base 40 is pivotally mounted to base 40 so that it may be pivoted open to gain access to drive elements. A drawer 42 (FIGS. 1 and 2) is provided in side 44 of base 40 which communicates with a water tray or reservoir 46 (see FIG. 2). Drawer 42 has an inclined lower surface 48 which functions generally as a funnel or ramp for feeding water discharged into drawer 42 into reservoir 46 through opening 50 (FIG. 4). Reservoir 46 is filled to below the level of opening 50. A "full" detector 52 detects when the level of water in reservoir 46 reaches a level just below the height of opening 50 and provides an indication thereof on an operator control panel (not shown) by means of a visual indicator 54 (FIG. 1). It is preferred that "full" detector 52 be of the mechanical type so that visual indicator 54 may provide a full indication when power to apparatus 20 is off. This permits reservoir 46 to be filled while the power is off, as well as when the power is on. However, detector 52 may be of the electro-optical or electro-mechanical type also. Access to drawer 42 from the exterior of apparatus 20 enables water to be introduced into reservoir 46 from the exterior of the apparatus without shutting apparatus 20 down, i.e., on the fly, simply by opening drawer 42 and pouring the water into the opened drawer.

Figure 6:
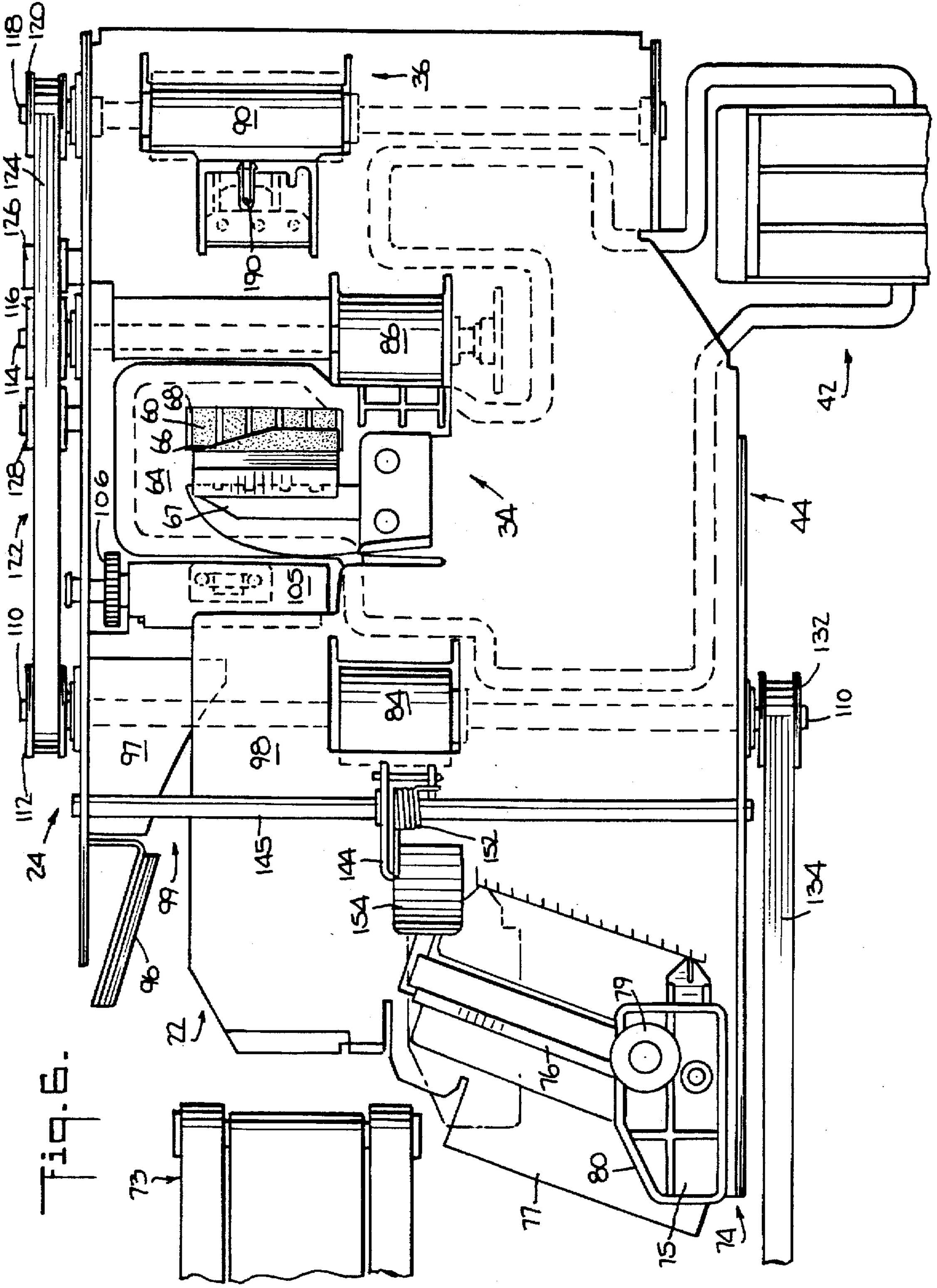
FIG. 6 is a top plan view of the apparatus of FIG. 1 with the cover removed.
Figure 7:
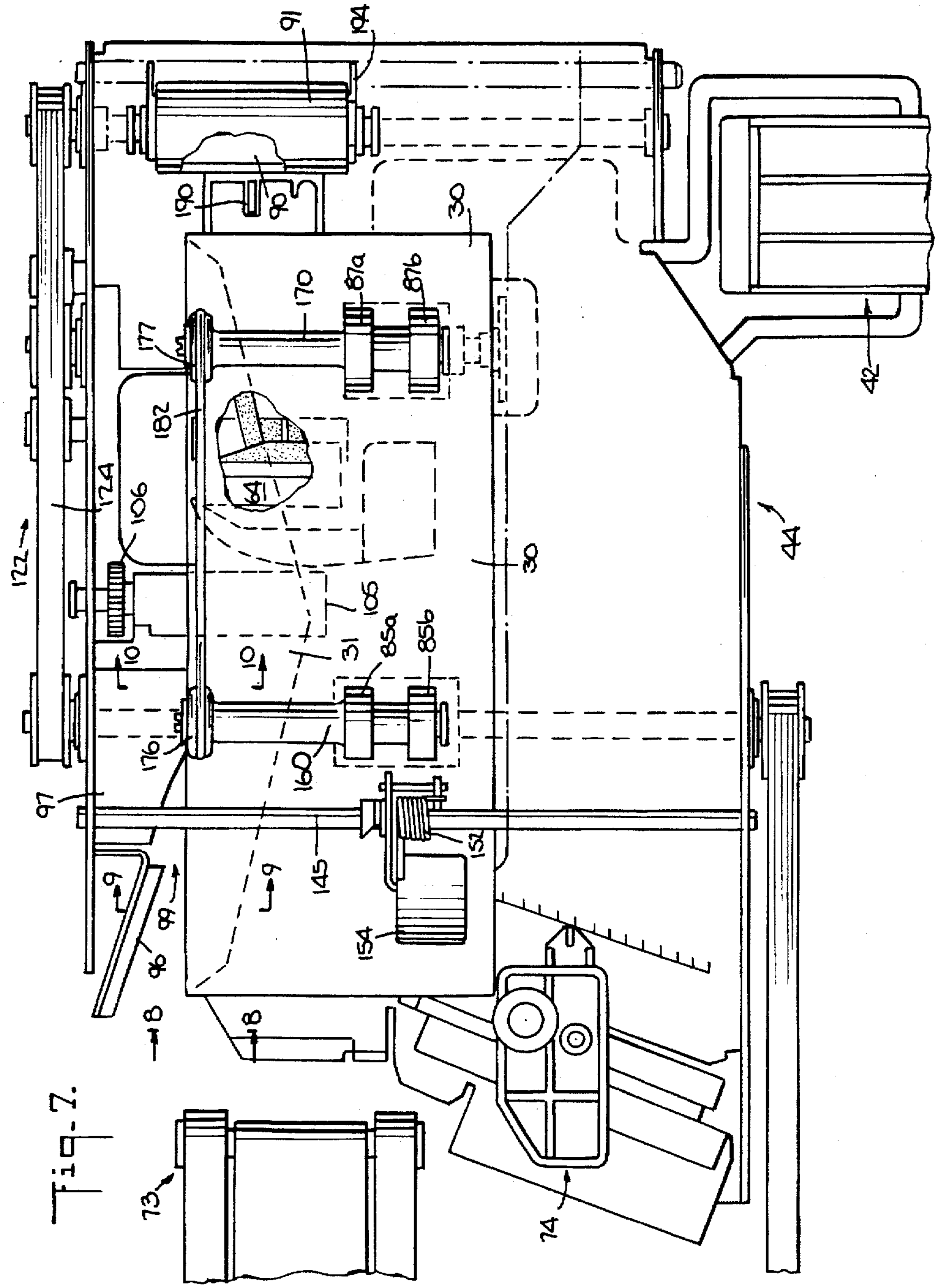
FIG. 7 is a top plan view of the apparatus of FIG. 1 with the top of the cover and other portions of the apparatus broken away.

As depicted in FIG. 2, a wick 60 which forms part of envelope flap moistener 32 extends from reservoir 46 upwardly to the top surface 64 of moistener 32 (see FIGS. 4–6) where the top of wick 60 contacts a moistening strip 66 attached to the underside of a blade 67. Water which rises in wick 60 is transferred to strip 66, which may be made of the same as or different material than wick 60 or which may be a brush, etc., or anything capable of receiving water from wick 60 and applying the water to an envelope flap. An envelope flap 31 is passed along moistener top surface 64 under blade 67 between strip 66 and the top of wick 60 (see FIG. 7) to apply moisture from the strip 66 to the envelope flap. A screen guard 68 (FIG. 11) is supported over the top of wick 60 by a friction fit in a recess 69 in moistener top surface 64. Guard 68 supports an envelope flap 31 passing over wick 60 while permitting water to be transferred from wick 60 to strip 66. As illustrated in FIG. 11, wick 60 may be replaced simply by lifted guard 68, grasping and withdrawing the wick, inserting a new wick and snapping the guard back into recess 69.

Referring to FIG. 2, reservoir 46 is relatively deep and wide, and wick 60 is relatively tall, e.g., 1½ inches. This ensures an adequate water supply for high speed operation. Also, a "low" sensor 72 monitors the water level in reservoir 46 for a low condition. Sensor 72 may be a of the electro-mechanical (e.g., of the float type) or electro-optical. The output of sensor 72 may be supplied to an operator control panel (not shown) and/or a system controller (not shown) to warn of a low water condition. The system controller may provide in response to sensing of a low water condition, an indication thereof as well as stop the feed of unsealed envelopes to apparatus 20.

Detector 52, indicator 54 and sensor 72 may be conventional and are represented functionally in the drawings as rectangular blocks.

Referring to FIGS. 1 and 4, an envelope 30 is turned to the longitudinal position shown in those figures by envelope turner 22 and is advanced towards flap moistener and sealer 34 by a transporter 73. An adjustable guide 74 is disposed at the entrance of moistener and sealer 34 to guide envelopes to the proper location for receipt by moistener and sealer 34. Guide 74 comprises a guide block 75 having a hole therethrough, a slot 76 in a bracket 77 mounted to base 40, a bolt 78 having a knob 79 and a nut (not shown) threaded to bolt 78 below slot 76. By loosening bolt 78, guide block 75 may be moved along slot 76 to adjust its position for different size envelopes. Guide block 75 has a tapered side surface 80 which engages the edge of an envelope and guides the envelope to the entrance of moistener and sealer 34.

Figure 3:
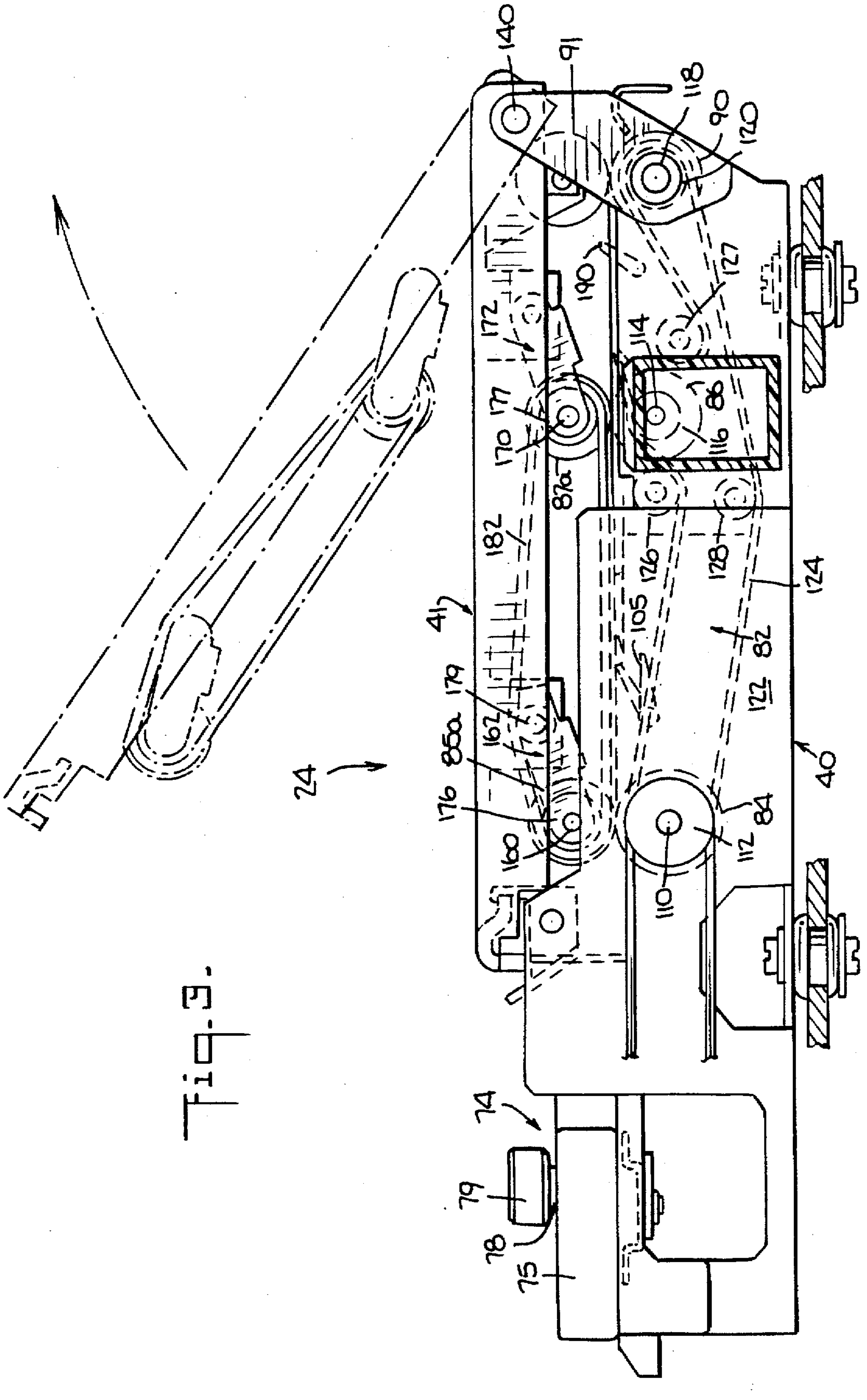
FIG. 3 a side elevation view of the apparatus of FIG. 1 showing in broken lines the cover pivoted open.
Figure 5:
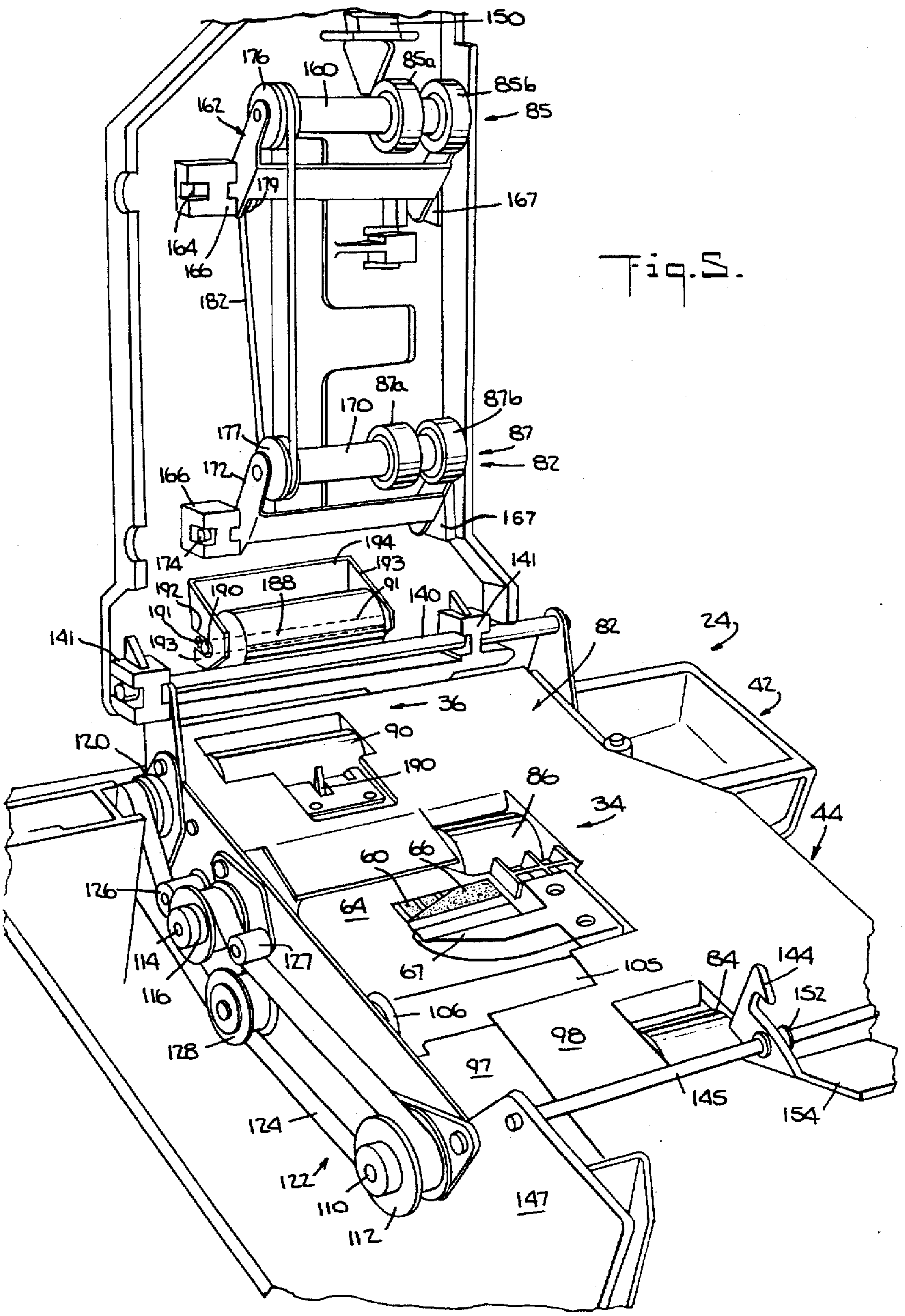
FIG. 5 is a perspective view of the top of the apparatus of FIG. 1 with the cover pivoted open.

Referring to FIGS. 1, 3 and 5, a transporter 82 (moving means) receives an envelope 30 from envelope turner 22 and moves the envelope to and past moistener 32. Transporter 82 comprises cooperating rollers mounted to base 40 and to cover 41. Roller 84 (first roller) and roller 86 (third roller) are mounted to base 40 and constitute part of the first or lower moving means. The pair of rollers 85*a*, 85*b*, referred to generally as roller or rollers 85 (second roller) and the pair of rollers 87*a*, 87*b*, referred to generally as roller or rollers 87 (third roller) are mounted to cover 41 and constitute part of the second or upper moving means. In the embodiment depicted in the drawings, lower rollers 84 and 86 are driven so that an envelope fed into the nip of rollers 84 and 85, and the nip of rollers 86 and 87 is advanced by the respective set of rollers. Rollers 84–87 move an envelope 30 to and past moistener 32 to moisten the flap 31 of the envelope, and also advance the envelope to the envelope sealer 36 which comprises first sealing roller 90 mounted to base 40 and second sealing roller roller 91 mounted to cover 41.

As shown in FIGS. 1 and 4, an envelope 30 is fed to envelope flap moistener and sealer 24 with the flap 31 of the envelope open. Moistener 32 includes structure which folds flap 31 into position to pass under blade 67 between moistening strip 66 and the top of wick 60 as illustrated in the sequence of FIGS. 8–10. Such structure includes vertical wall 96 which projects inwardly and functons as a camming surface, horizontal surface 97 extending from wall 96 parallel to and spaced slightly below deck 98, the space 99 between deck 98 and wall 96, and the portion of deck 98 adjacent wall 96 and surface 97.

Referring to FIG. 4, envelope 30 is advanced by transporter 73 of envelope turner 22 past guide 75 into contact with wall 96 which cams the envelope flap 31 inwardly into opening 99 as the envelope advances. Referring to FIGS.

8–10, continued advancement of envelope 30 by transporter 73 causes the flap 31 to be cammed downwardly by wall 96 into space 99 from the position illustrated in FIG. 8 to the position illustrated in FIG. 9. In FIGS. 8–10, 30*a* represents the top of envelope 30, 30*b* represents the bottom, 31 represents the envelope flap, and 101 represents an enclosure in envelope 30. Continued advancement of envelope 30 then causes surface 98 to fold flap 31 under deck 98 into the space between the bottom of deck 98 and the top of surface 97, as shown in FIG. 10. Envelope 30 is then advanced towards wick 60 by transporter 82 mounted in base 40 and cover 41.

Envelope 30 is presented to envelope flap moistener and sealer 24 in the configuration of FIG. 10 with flap 31 between blade 67 and guard 68 such that the gummed inside of flap 31 is passed in contact with the moistener strip 66. Thereafter, moistened envelope 30 is advanced to the nip of rollers 96 and 91 (FIG. 5) of envelope flap sealer 36 which compresses the envelope between the rollers to seal the envelope flap.

A diverter blade 105 is disposed upstream of wick 60 to either permit an envelope flap to pass under blade 67 to be moistened, or divert an envelope with a sealed flap over blade 67. In its down position illustrated in the drawings, diverter blade 105 guides an envelope flap between moistener strip 66 and screen guard 68. A knurled knob 106, accessible from side 122 when cover 41 is pivoted open, is fixed to a rod which in turn is fixed to diverter blade 105. Diverter blade 105 may be rotated to its upper position (see FIG. 3) so that the flap of a sealed envelope is not guided under blade 67 but rather over it so that the flap is not moistened. Moistener 32 itself may be conventional.

Referring to FIGS. 3 and 4, roller 84 is fixed to a shaft 110 which is rotatably supported in base 40 by bearings (not shown). A pulley 112 is fixed to an end of shaft 110. Roller 86 is fixed to a shaft 114 which is rotatably supported in base 40 by bearings (not shown) and a pulley 116 is fixed to an end of shaft 114. Roller 90 is fixed to shaft 118 which is rotatably supported in base 40 by bearings, and a pulley 120 is fixed to an end of shaft 118. Pulleys 112, 116 and 120 are fixed to the respective shafts on a common side 122 of base 40. A belt 124 is passed around pulleys 112 and 120 and engaged with pulley 116 by means of tension rollers 126, 127 and take-up pulley 128 so that rollers 84, 86 and 90 rotate in synchronism. A pulley 132 fixed to shaft 118 at the end thereof on base side 44 is driven by a belt 134 passed therearound, so that belt 134 supplies the drive for rollers 84, 86 and 90. Belt 134 is coupled to pulley 136 and idler 137 of envelope turner 22, and to a drive motor which is not shown.

As shown in FIGS. 3–5, cover 41 is pivotally mounted to base 40 by a rod 140 passing through spaced projections 141 (FIG. 5) at one end of cover 41. Rod 140 is supported by wall abutments 142 projecting from base 40. Cover 41 is latched at the end thereof opposite to the pivoted end to base 40 by a hook 144 pivotally mounted to a rod 145 supported from side walls 146, 147 of base 40, and a receptacle device 150 (FIG. 5) fixed to the underside of cover 41. A spring 152 (FIG. 4) wound on rod 145 urges hook 144 clockwise into engagement with receptacle device when cover 41 is pivoted closed. A latch release handle 154 is connected to hook 144 so that it may be manually pivoted counter-clockwise to release hook 144 from engagement with receptacle device 150.

Referring to FIG. 5, rollers 85 are fixed to a shaft 160 rotatably supported from a bracket 162 which in turn is rotatably supported by a rod 164 fixed to the underside of cover 41 by spaced projections 166, 167. Springs (not shown) wound on rod 164 engage projections 166, 167 and bracket 162 to urge bracket 162 counterclockwise. Rollers 87 are similarly fixed to a shaft 170 rotatably supported from a bracket 172 which in turn is rotatably supported by a rod 174 fixed to the underside of cover 41 by spaced projections 166,167. Springs 168 similarly urge bracket 172 counterclockwise.

Each of shafts 160 and 170 (FIG. 5) have fixed thereto a grooved roller 176, 177, respectively, around which is wound an O-ring 182 (the rolling elements referred to above). O-ring 182 is also passed in engagement with an idler roller 179. Rotation of either shaft 160 or 170, or both, rotates one or both rollers 176, 177 which causes O-ring 182 to rotate. Roller 91 (FIG. 5) is fixed to a shaft 188 which is rotatably supported by bearings 190 which are in turn resiliently supported by springs 191 guided in slots 192 in arms 193 of a bracket 194 fixed to the under side of cover 41. Thus, rollers 85 and 176, rollers 87 and 177, and roller 91 are resiliently supported from cover 41. As a result, with reference to FIG. 3, rollers 85 resiliently engage roller 84, rollers 87 resiliently engage roller 86 and roller 91 resiliently engages roller 90, and an envelope passing between respective sets of engaged rollers is advanced along envelope travel path 32 due to rotation of the driven rollers mounted in base 40. At the same time, O-ring 182, which is just above (e.g. 1/16 inch) the flat deck 98 upper surface, engages the top of an envelope portion to assist in the advance of the envelope and prevent the flap from lifting up which may otherwise result from the diverter blade 105 and from drag on the flap as it passes between strip 66 and wick 60.

Resilient mounting of rollers 85, 87 and 91 enables envelope moistener and sealer 24 to accommodate envelopes of varying thickness, e.g., up to ¼ inch. Resilient mounting also assists latching the cover to the base by urging hook 144 into receptacle 150. Roller 90 in base 40 includes a layer of foam fixed to the outer periphery thereof which compresses slightly in accordance with the contour of the envelope to assist in securely sealing the envelope flap and accommodating envelopes of varying thickness between rollers 90 and 91.

Rollers 85 and 87 in base 40 are spaced on the upstream and downstream sides, respectively, of wick 60 by a distance that ensures that envelopes within a given size range are engaged by at least one of those rollers as the envelope flap passes over wick 60. In the embodiment depicted in the drawings, this also allows in a simple manner the O-ring 182 to span the length of the envelope and remain in contact with it as it is passed over wick 60. As a result, an envelope within the given size range is positively driven past wick 60.

A sensor 190 in the form of a lever actuated switch disposed in base 40 just upstream of roller 90 provides signals to the system controller when the lever is tripped and un-tripped. Those signals are processed and used to indicate that the upstream edge of an envelope has just entered the nip of rollers 90 and 91, i.e., that an envelope has cleared envelope moistener and sealer 24 and that it is ready to receive another envelope.

Providing transporter 80 partly mounted to base 40 and partly mounted to cover 41, with all of the drive components in the base 40, and pivotally mounting cover 41 to base 40, enables one to quickly gain access to the envelope path simply by unlatching cover 41 and pivoting it. This enables an operator to quickly gain access to the envelope path to remove any jammed envelope.

Certain changes and modifications of the embodiments of the invention herein disclosed will be readily apparent to those of skill in the art. For example, pairs of rollers 85*a, b* and 87*a, b* may be replaced by a single roller, different driving arrangements may be employed, different support arrangements for the various rollers may be employed, etc. It is the applicant's intention to cover by the claims all such uses and all those changes and modifications which could be made to the embodiments of the invention herein chosen for the purposes of disclosure which do not depart from the spirit and scope of the invention.

What is claimed is:

1. An envelope moistener comprising:

a base;

means mounted to said base for moistening an envelope flap passed thereby, said moistening means comprising a reservoir in said base, means in communication with said reservoir for applying moisture to said flap and means in communication with said reservoir accessible from the exterior of said base for introducing water in said reservoir; and means for moving an envelope in a path to and past said moistening means, wherein said means for introducing water into said reservoir comprises a hole in said base communicating with said reservoir, a drawer slidably mounted in said hole above said reservoir movable between an open position in which water introduced into said drawer may flow into said reservoir and a closed position in which said drawer is substantially flush with said base.

2. The envelope moistener of claim 1 wherein said moisture applying means comprises a wick disposed in a hole in said base with a first end of said wick in said reservoir and a second end of said wick exposed through the hole, and a grate covering said second end while permitting moisture to be transferred from said wick, said grate and said opening being structured to form a snap mount of said grate to said hole, whereby said grate may be removed from said hole and said wick removed from said reservoir through said hole.

* * * * *